United States Patent [19]

Geisseler

[11] Patent Number: 4,798,930
[45] Date of Patent: Jan. 17, 1989

[54] PROCESS FOR PRODUCING A WELD-BUILT MEMBER

[75] Inventor: Max Geisseler, Ettenhausen, Switzerland

[73] Assignee: Sulzer Brothers Limited, Winterthur, Switzerland

[21] Appl. No.: 35,095

[22] Filed: Apr. 6, 1987

[30] Foreign Application Priority Data

Apr. 9, 1986 [CH] Switzerland ............ 1403/86

[51] Int. Cl.⁴ .............................. B23K 9/04
[52] U.S. Cl. .................. 219/76.12; 219/76.14; 228/184
[58] Field of Search ........... 219/76.1, 76.12, 76.14, 219/76.15; 29/400 N, 157 R, 557; 228/184

[56] References Cited

U.S. PATENT DOCUMENTS 3,610,876 10/1971 Bhat ..................... 219/76.15 X
3,611,541 10/1971 Garrett ................. 219/76.14 X

FOREIGN PATENT DOCUMENTS 0049899 4/1982 European Pat. Off. ......... 219/76.12
3430114 2/1986 Fed. Rep. of Germany ..... 219/76.1
0118373 6/1985 Japan ................................. 219/76.1
0715252 2/1980 U.S.S.R. ............................. 219/76.14

Primary Examiner—Clifford C. Shaw
Attorney, Agent, or Firm—Kenyon & Kenyon

[57] ABSTRACT

Built-up or facing material is melted in an electric arc between a parent member and at least one electrode movable relative to the parent member. As the electrode moves, at least one welding parameter is varied in a predetermined zone of movement in order to form an open channel. After passing this zone, the original welding parameters are restored and a former is placed over the channel to complete the cross-section of the channel. Welding continues until the required wall member has been reached. The former can be subsequently removed by dissolving or decomposition. The open channels may receive neutron-absorbent material where the member is used as a cylindrical storage receptacle for nuclear fuel elements.

9 Claims, 1 Drawing Sheet

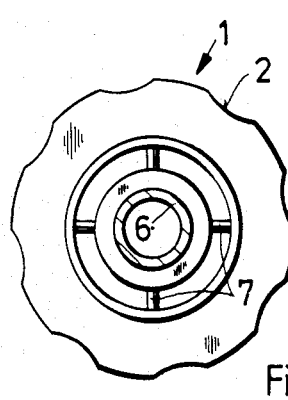
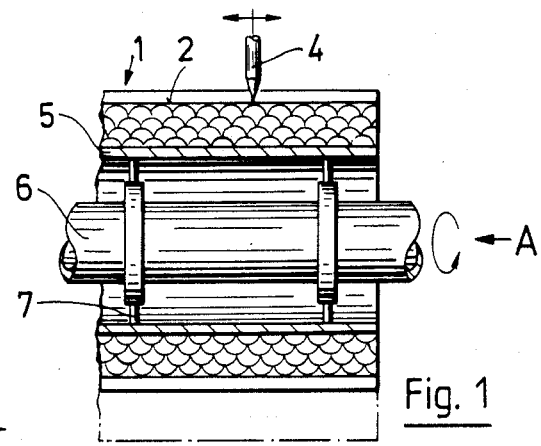
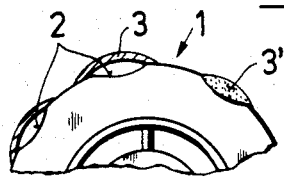
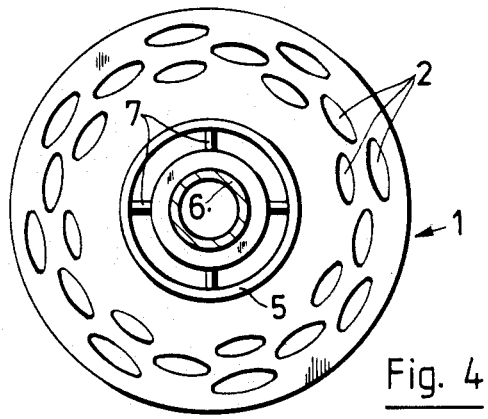
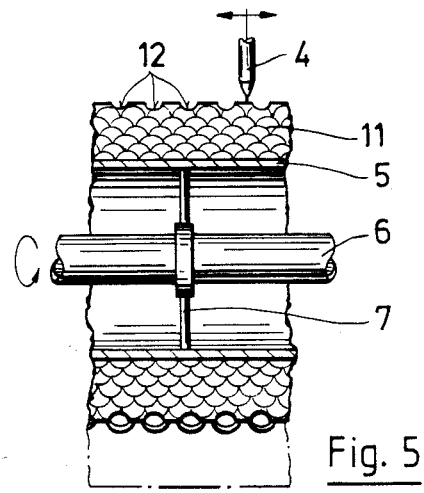
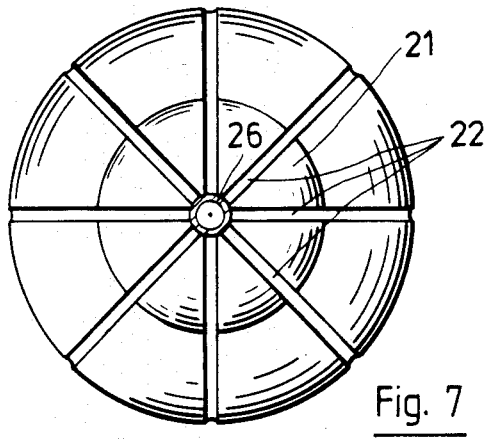
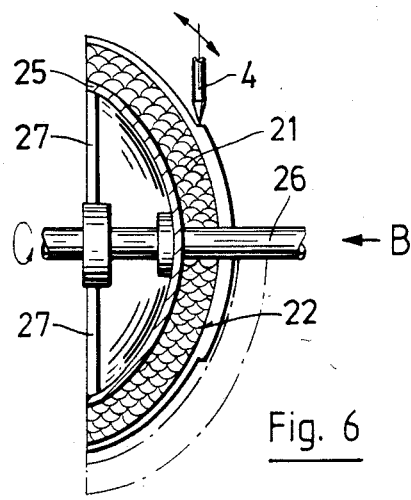

PROCESS FOR PRODUCING A WELD-BUILT MEMBER

This invention relates to a process for producing a weld-built member and to a weld-built member made thereby.

As is known, various types of techniques have been used for the manufacture of weld-built members. Generally, in one known process, built-up or facing material is melted in an electric arc between a parent member and at least one electrode with the parent member and the electrode being movable relative to each other while the material is deposited onto the parent member. Usually, the members which are produced in this process have a completely homogeneous wall. However, in some cases, it is necessary for such members to have a channel in the wall through which a heating or cooling medium, may flow in order to act on the temperature of the member or, in the case of a hollow member, on the temperature of the contents of the hollow member. In the past, the channels have been subsequently formed in the wall by a mechanical treatment such as drilling. However, this has generally required very elaborate procedures and also restricts the shapes to which the channels can be made.

Accordingly, it is an object of the invention to be able to form channels in a built-up member during fabrication.

It is another object of the invention to provide a relatively simple process for forming channels in a weld-built member of diverse cross-sectional shapes.

Briefly, the invention provides a process for producing a weld-built member in which an electric arc is established between a parent member and at least one electrode, a built-up material is melted in the arc under a set of welding parameters and the parent member and electrode are moved relative to each other while melted material is deposited on the parent member. In accordance with the invention, at least one welding parameter is varied in at least one predetermined zone of relative movement between the electrode and the parent member to interrupt depositing of the material in order to form an open channel therein. In addition, a former is placed in the formed open channel to define a closed channel of predetermined cross-sectional shape. Thereafter, the relative movement of the parent member and the electrode is resumed while melted material is deposited under the original set of welding parameters to close over the former and form a wall of predetermined thickness of the built-up material on the parent member.

The invention also provides a weld-built member having a wall of predetermined thickness with at least one channel of lenticular cross-sectional shape extending within the wall.

The process provides a simple and low cost way of producing channels while the wall of the member is being built-up.

The cross-section of the channels can be circular or of any other suitable lenticular shape. Also, the channels may extend longitudinally of the built-up member or in any other suitable manner.

If the dimension of the cross-section of the channel is greater, as measured in the direction of layer thickness, than the layer thickness of built-up material produced in one pass of the electrode, the welding parameters can be repeatedly altered and restored before the former is placed in the open channel.

The process is particularly suited to the production of cylindrical storage receptacles for nuclear fuel elements. In this case, the channels in such a storage receptacle can be filled with a neutron-absorbent substance. Further, the channels of such receptacles may have a greater dimension in the peripheral direction than in the radial direction of the receptacle.

These and other objects and advantages of the invention will become more apparent from the following detailed description taken in conjunction with the accompanying drawings therein:

FIG. 1 diagrammatically illustrates a longitudinal sectional view through a cylindrical member being built-up in accordance with the process of the invention;

FIG. 2 illustrates an end view of the member of FIG. 1 taken in the direction indicated by arrow A of FIG. 1;

FIG. 3 illustrates a partial end view of the member of FIG. 2 in a subsequent phase of build-up;

FIG. 4 illustrates an end view of the member in a finished phase;

FIG. 5 diagrammatically illustrates a longitudinal sectional view through another cylindrical member being built-up in accordance with the invention;

FIG. 6 illustrates a diagrammatic radial sectional view through a part-spherical member being built-up in accordance with a process according to the invention; and FIG. 7 illustrates an end view of the member of FIG. 6 taken in the direction indicated by the arrow B in FIG. 6.

Referring to FIGS. 1 and 2, in order to form a weld-built member 1 which will subsequently be of use as a storage receptacle for nuclear fuels, a parent member 5 in the form of a hollow cylinder which is opened at both ends is positioned on a shaft 6 in a coaxial manner by means of a plurality of radial supports 7. The shaft 6, in turn, is driven by a suitable drive means (not shown) to produce a controlled uniform-rotation of the parent member 5.

In addition, a melting electrode 4 is positioned adjacent the parent member 5 and is moved in controlled fashion by means of drive elements (not shown) parallel to the longitudinal axis of the parent member 5. During operation, an electric arc is established between the parent member 5 and the electrode 4 and built-up material is melted in the arc for depositing unto the parent member 5.

The rotation of the shaft 6 can be so adapted to the displacement of the electrode 4 that the weld seams which form the built-up member 1 are applied helically, first on the parent member 5 and then in layers on the weld seams already present.

The welding technique used may be submerged welding or inert gas welding. Inert gas welding using a non-melting electrode and a separate welding rod bead is also possible.

During the build-up process, at least one welding parameter is varied, for example, the speed of rotation of the shaft 6 and/or the rate of melting, in at least one predetermined zone of relative movement between the electrode 4 and the parent member 5 in order to interrupt depositing of the weld material and thus form an open channel 2 therein. As indicated in FIGS. 1 and 2, the open channels 2 are disposed longitudinally and in parallel to the axis of the shaft 6. It is advantageous for production if the open channels 2 have a semi-lenticular cross-section with a major axis extending lengthwise of the weld seams.

After a row of open channels has been formed, the built-up process is interrupted. At this time, the surfaces of the open channels 2 are smoothed by means of a mechanical treatment. Thereafter a former 3 of aluminum and of thin plate-like curved shape is disposed in bridging relation over each channel 2 in order to define a closed channel of predetermined cross-sectional shape. As indicated in FIG. 3, the outer surface of the former 3 forms a mirror image of the contour of the open channel 2. In addition, each former 3 may be secured to the edge of a channel 2 by spot welding.

Thereafter, the welding process is resumed so that the parent member 5 and electrode 4 move relative to each other while melted material is deposited under the original set of welding parameters to complete the wall while closing over each former 3. During this time, the weld parameters are varied in the zones containing the channels 2 so as to obviate any accumulation of material near the channels 2, that is, to obviate any irregularity in the thickness of the wall of the member 1 near the channels 2.

After termination of the welding process, the formers 3 can be removed, for example, a hot and preferably liquid medium at a temperature of approximately 700° C. is pumped through the now closed channels 2 to dissolve and flush the formers 3 from the wall in order to leave channels having a closed lenticular cross-section and a smooth surface.

Referring to FIG. 3, use may be made of a former 3' which completely fills the cross-section of an open channel 2. In this case, such a former 3' can be made of a material such as that used for foundry cores. These formers 3' may be removed from the finished member 1 in the same way as foundry cores are removed from castings.

After the member has been completely built-up, the parent member 5 is removed, for example by mechanical treatment. If required, the other surfaces of the member 1 can be given mechanical treatment.

Next, the channels 2 are filled with a neutron-absorbent material. As indicated in FIG. 4, the channels 2 are formed in annular rows at different radial distances from the axis of the member with the channels in adjacent rows being disposed in overlapping relation to each other. Consequently, every neutron issuing from the interior of the storage receptacle can be reliably intercepted by the neutron-absorbent material in the channels 2.

Of note, the annular member 1 which is produced in accordance with the process can be closed at both ends by covers which are welded on in order to complete a storage receptacle.

Referring to FIG. 5, wherein like reference characters indicate like parts as above, a built-up member 11 in the form of a thick-wall cylinder may be provided with a single helical channel 12 in the wall at a constant distance from the cylinder axis, for example for conducting a flow of coolant therethrough. In this case, the member 11 is built up in the same way as the member illustrated in FIGS. 1 to 3 by weld metal being applied helically to the rotating parent member 5. The channel 12 is produced as an initially open channel in a condition as indicated in FIG. 5. As the electrode 4 approaches the channel zone, the welding parameters are varied and then restored after the electrode has passed the zone. Consequently, the helical weld seams of built-up material have a different pitch from that of the helical channel 12. The open channel 12 can then be machined smooth and, thereafter, a former, as indicated at the bottom of FIG. 5, can be placed over the channel 12 and build-up welding resumed until the member 11 is completed.

Referring to FIGS. 6 and 7, a built-up member 21 of parabolical shape may also be fabricated in accordance with the process. Such a member may be used, for example, as a mirror support plate of a solar collector for a solar power station.

In this embodiment, as shown in FIG. 6 a parent 25 having the shape of a paraboloid is connected both directly and by way of radial supports 27 to a rotatable shaft 26. In addition, an electrode 4 which is movable parallel to the parent member 25 is positioned to melt weld metal in an arc initially unto the parent member 25 and then on to weld material which has been previously applied. Controllable drive means (not shown) rotates the shaft 26 uniformly and so moves the electrode 4 that the weld metal is applied helically.

During processing, the welding parameters are varied in the radial places where channels 22 are required and thereafter restored as described in the above embodiments.

Since the dimensional stability of the mirror of a solar collector is important from the standpoint of efficiency, in order to keep the temperature of the support plate constant, the channel 22 are flowed through in operation by a cooling or heating medium whose quantity is controlled.

Upon termination of built-up welding, the parent member 25 is separated from the built-up member 21 and the concave mirror surface of the member 21 is polished. Weld metal which is applied directly to the parent member is a hardenable substance which, after the mirror surface has been produced, is virtually scratch-proof. The parent member 25 is made, for example of copper which removes the heat of welding satisfactorily. If the parent member 25 is provided with additional cooling, for example, with water, the parent member 25 and the built-up member 21 will not become connected one to another even at a high welding rate.

The built-up member may be made of any suitable welding or facing material. Further, the built-up member may have a shape other than that illustrated in FIGS. 1, 5 and 6. For example, the built-up member may have a plane or conical shape. Also, the parent member may rotate about a vertical or inclined axis. Still further, the cross-section and longitudinal extent of the channels may also have different shapes.

The welding process may proceed using a plurality of electrodes simultaneously either at the same welding station or at various parts of the built-up member.

The former can be made as a sliding pressure pad, for example of copper, which is disposed opposite the electrode or electrodes in order to provide support during build-up welding for the weld metal covering the open channel until such metal solidifies.

The welding operation may be so controlled, for example, by a computer, so that very complicated channel arrangements, such as involutes and spirals can be produced.

The term "welding parameters" is to be understood as denoting all such parameters as affect the production of the built-up member, for example, the position of the welding head guiding the electrode relative to the built-up member and relative movements therebetween.

Chemical decomposition may also be used to remove the formers from the channels after termination of the built-up process.

The invention thus provides a relatively simple process of forming a closed channel in a weld-built member while also providing a weld-built member which can be made in a relatively simple and economical process.

What is claimed is:

1. A process for producing a weld-built member comprising the steps of
    establishing an electric arc between a parent member and at least one electrode;
    melting build-up material in said arc under a set of welding parameters;
    moving the parent member and the electrode relative to each other while depositing the melted material on the parent member;
    varying at least one welding parameter in at least one predetermined zone of relative movement between the electrode and parent member to interrupt depositing of the material and form an open channel therein;
    placing a former in the formed open channel to define a closed channel of predetermined cross-sectional shape; and
    thereafter resuming the relative movement of the parent member and the electrode while depositing melted material under said set of welding parameters to close over the former and form a wall of predetermined thickness of build-up material on the parent member.

2. A process as set forth in claim 1 wherein the parent member is rotated about an axis thereof.

3. A process as set forth in claim 1 wherein said step of varying at least one weld parameter proceeds gradually to define an open channel of curved cross-sectional shape.

4. A process as set forth in claim 1 which further comprises the step of mechanically treating the open channel prior to placement of the former therein.

5. A process as set forth in claim 1 which further comprises the step of removing the former after completion of the wall on the parent member.

6. A process as set forth in claim 5 wherein the former is dissolved and subsequently flushed from the wall in said step of removing.

7. A process of forming a closed channel in a weld-built member comprising the steps of
    establishing an electric arc between a parent member and at least one electrode;
    moving the parent member and the electrode relative to each other while depositing melted build-up material in the arc onto the parent member;
    interrupting the depositing of the melted material in at least one predetermined zone during relative movement between the electrode and the parent member to form an open channel therein;
    placing a former in the formed open channel to define a closed channel of predetermined cross-sectional shape; and
    thereafter resuming depositing of the melted material in said zone over the former during continued relative movement of the electrode and the parent member.

8. A process as set forth in claim 7 wherein the former is of plate-like curved shape and is disposed in bridging relation over the channel.

9. A process as set forth in claim 7 wherein the form completely fills the channel.

* * * * *

UNITED STATES PATENT AND TRADEMARK OFFICE
CERTIFICATE OF CORRECTION

PATENT NO. : 4,798,930

DATED : January 17, 1989

INVENTOR(S) : MAX GEISSELER

It is certified that error appears in the above-identified patent and that said Letters Patent is hereby corrected as shown below:

```
Column 2, line 48 change "unto" to -onto-
Column 3, line 6 change "thereafter a" to -Thereafter, a-
Column 4, line 12 change "parent 25" to -parent member 25-
Column 4, line 17 change "unto" to -onto-
Column 4, line 18 change "on to" to -onto-
Column 4, line 56 change "example of" to -example, of-
Column 6, line 33 change "form" to -former-
```

Signed and Sealed this

Tenth Day of October, 1989

Attest:

DONALD J. QUIGG

Attesting Officer

Commissioner of Patents and Trademarks